United States Patent
Nakashima et al.

(10) Patent No.: US 9,816,738 B2
(45) Date of Patent: Nov. 14, 2017

(54) EJECTOR

(71) Applicant: DENSO CORPORATION, Kariya, Aichi-pref. (JP)

(72) Inventors: Ryota Nakashima, Kariya (JP); Etsuhisa Yamada, Kariya (JP); Haruyuki Nishijima, Kariya (JP); Yoshiaki Takano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 107 days.

(21) Appl. No.: 14/910,281

(22) PCT Filed: Jul. 24, 2014

(86) PCT No.: PCT/JP2014/003890
§ 371 (c)(1),
(2) Date: Feb. 5, 2016

(87) PCT Pub. No.: WO2015/019564
PCT Pub. Date: Feb. 12, 2015

(65) Prior Publication Data
US 2016/0169566 A1    Jun. 16, 2016

(30) Foreign Application Priority Data
Aug. 9, 2013 (JP) .................. 2013-165981

(51) Int. Cl.
*F25B 1/06* (2006.01)
*F25B 41/00* (2006.01)
(Continued)

(52) U.S. Cl.
CPC .............. *F25B 41/00* (2013.01); *F04F 5/04* (2013.01); *F04F 5/54* (2013.01); *F25B 9/08* (2013.01);
(Continued)

(58) Field of Classification Search
CPC .... F25B 41/00; F25B 2341/0012; F25B 9/08; F04F 5/04; F04F 5/54; B60H 2001/3298
See application file for complete search history.

(56) References Cited

U.S. PATENT DOCUMENTS

| 5,313,711 A | 5/1994 | Kling, III et al. |
| 2002/0000095 A1 | 1/2002 | Takeuchi et al. |

(Continued)

FOREIGN PATENT DOCUMENTS

| JP | 3331604 B2 | 10/2002 |
| JP | 2002333000 A | 11/2002 |

(Continued)

OTHER PUBLICATIONS

International Search Report and Written Opinion (in Japanese with English Translation) for PCT/JP2014/003890, dated Oct. 28, 2014; ISA/JP.

*Primary Examiner* — Elizabeth Martin
(74) *Attorney, Agent, or Firm* — Harness, Dickey & Pierce, P.L.C.

(57) ABSTRACT

An approximately conical passage-forming member is disposed inside a body in which a swirling space for swirling a refrigerant is formed, and an ejector defines therein a nozzle passage that functions as a nozzle for depressurizing a refrigerant that has flowed out from the swirling space between an inner circumferential surface of the body and the passage-forming member, and a diffuser passage that pressurizes a mixed refrigerant obtained from a refrigerant sprayed from the nozzle passage and a refrigerant drawn from a suction-passage. A plurality of driving passages through which a refrigerant is introduced from a distribution space to the swirling space are formed in the body. In this case, the driving passages are formed in a manner such that a refrigerant flowing in from each driving passage into the swirling space flows along an outer circumference of the (Continued)

swirling space and flows in directions different from each other. Accordingly, nozzle efficiency is sufficiently improved.

5 Claims, 13 Drawing Sheets

(51) Int. Cl.
  *F04F 5/04* (2006.01)
  *F04F 5/54* (2006.01)
  *F25B 40/02* (2006.01)
  *F25B 9/08* (2006.01)
  *B60H 1/32* (2006.01)

(52) U.S. Cl.
  CPC ...... *F25B 40/02* (2013.01); *B60H 2001/3298* (2013.01); *F25B 2341/0012* (2013.01)

(56) References Cited

U.S. PATENT DOCUMENTS

| | | |
|---|---|---|
| 2013/0305776 A1 | 11/2013 | Alahyari et al. |
| 2015/0033790 A1 | 2/2015 | Yamada et al. |

FOREIGN PATENT DOCUMENTS

| | | |
|---|---|---|
| JP | 2003014318 A | 1/2003 |
| JP | 2007120441 A | 5/2007 |
| JP | 2008202812 A | 9/2008 |
| JP | 2008232458 A | 10/2008 |
| JP | 2010210111 A | 9/2010 |
| WO | WO-2012108982 A1 | 8/2012 |
| WO | WO-2013114856 A1 | 8/2013 |

EJECTOR

CROSS-REFERENCE TO RELATED APPLICATION

This application is a U.S. National Phase Application under 35 U.S.C. 371 of International Application No. PCT/JP2014/003890 filed on Jul. 24, 2014 and published in Japanese as WO 2015/019564 A1 on Feb. 12, 2015. This application is based on and claims the benefit of priority from Japanese patent application No. 2013-165981 filed on Aug. 9, 2013. The entire disclosures of all of the above applications are incorporated herein by reference.

TECHNICAL FIELD

The present disclosure relates to an ejector that depressurizes a fluid and draws a fluid by the suction force of a sprayed fluid sprayed at a high speed.

BACKGROUND ART

In the related art, as a depressurization device that is applied to a vapor compression refrigeration cycle device, an ejector has been known. In this kind of ejector, a nozzle portion that depressurizes a refrigerant is provided, a gas-phase refrigerant that has flowed out from an evaporator is drawn by suction of a refrigerant sprayed from the nozzle portion, and the sprayed refrigerant and the drawn refrigerant are mixed so as to be pressurized by a pressure increase part (diffuser portion).

Accordingly, in a refrigeration cycle device (hereinafter, referred to as an ejector type refrigeration cycle) including an ejector as a depressurization device, power consumption of a compressor can be decreased using refrigerant pressure action in the pressure increase part of an ejector, and a coefficient of performance (COP) of a cycle can be further improved to a greater extent than a general refrigeration cycle device including an expansion valve or the like as a depressurization device.

In PTL 1, as an ejector applied to an ejector type refrigeration cycle, an ejector including a nozzle portion that depressurizes a refrigerant in two steps is disclosed. More specifically, in the ejector of PTL 1, a refrigerant in a high-pressure liquid phase state is depressurized by a first nozzle until the refrigerant reaches a gas-liquid two phase state, and the refrigerant in the gas-liquid two phase state flows into a second nozzle.

Accordingly, in the ejector of PTL 1, boiling of a refrigerant in the second nozzle is promoted, nozzle efficiency of the entire nozzle portion is improved, and in the entire ejector type refrigeration cycle, COP is further improved.

In a general ejector, a diffuser portion (pressure increase part) is coaxially disposed on an extension line in an axial direction of a nozzle portion. PTL 2 discloses that ejector efficiency can be improved by relatively decreasing the spreading angle of the diffuser portion disposed as described above.

The nozzle efficiency means energy conversion efficiency when the pressure energy of a refrigerant in a nozzle portion is converted into kinetic energy, and ejector efficiency means energy conversion efficiency in the entire ejector.

PRIOR ART LITERATURE

Patent Literature

PTL 1: JP 3331604 B
PTL 2: JP 2003-14318 A

SUMMARY OF THE INVENTION

For example, in the ejector of PTL 1, a thermal load of the ejector type refrigeration cycle decreases, and when a pressure difference (a difference between a high pressure and a low pressure) between the pressure of a high-pressure side refrigerant and the pressure of a low-pressure side refrigerant of the cycle decreases, depressurization corresponding to the difference between the high pressure and the low pressure is generated in the first nozzle, and thereby causes the possibility that most of the refrigerant may not be depressurized in the second nozzle.

In this case, since a gas-liquid two phase refrigerant flows into the second nozzle, improvement effects of the nozzle efficiency cannot be obtained, and the refrigerant may not be sufficiently pressurized in the diffuser portion.

Meanwhile, it may be considered that a refrigerant in the diffuser portion even during a low load of the ejector type refrigeration cycle is sufficiently pressurized by applying the diffuser portion disclosed in PTL 2 having a relatively small spreading angle to the ejector of PTL 1 and improving the ejector efficiency.

However, when the diffuser portion is applied, the length in the axial direction of the nozzle portion in the entire ejector increases, and thereby causes the possibility that a volume of the ejector may unnecessarily increase during a general load of the ejector type refrigeration cycle.

The present disclosure is made in consideration of the above-described problems, and an object thereof is to sufficiently improve nozzle efficiency in an ejector that depressurizes a refrigerant swirled in a swirling space.

A first aspect of the present disclosure is an ejector applied to a vapor compression refrigeration cycle device, the ejector including:

a body having a swirling space that swirls a refrigerant that has flowed in from a refrigerant inlet port, a depressurizing space that depressurizes the refrigerant that has flowed out from the swirling space, a suction-passage that is in communication with a downstream side of the depressurizing space in a refrigerant flow and that draws the refrigerant from an outside, and a pressurizing space, the refrigerant sprayed from the depressurizing space and the refrigerant drawn from the suction-passage flowing into the pressurizing space; and a passage-forming member, at least a portion of the passage-forming member being disposed inside the depressurizing space and the pressurizing space, the passage-forming member having a conical shape in which a sectional area thereof gradually widens in a direction away from the depressurizing space, wherein a refrigerant passage formed between an inner circumferential surface of a portion of the body defining the depressurizing space and an outer circumferential surface of the passage-forming member is a nozzle passage that depressurizes and sprays the refrigerant that has flowed out from the swirling space, a refrigerant passage formed between an inner circumferential surface of a portion of the body defining the pressurizing space and the outer circumferential surface of the passage-forming member is a diffuser passage that converts kinetic energy of a mixed refrigerant of the sprayed refrigerant and the drawn refrigerant into pressure energy, the swirling space is formed in a rotational body shape that is symmetrical about a center axis, the center axis of the swirling space and a center axis of the passage-forming member are coaxially arranged, a plurality of driving passages through which the refrigerant is introduced from the refrigerant inlet port into the swirling space are formed in the body, and when viewed along an axial direction of the passage-forming member, the refrigerants flowing in from the plurality of driving passages into the swirling space have velocity components in directions in which the refrigerants flow along an outer circumference of the swirling space, the directions of the velocity components being different from each other.

According to this, when viewed along the axial direction of the passage-forming member, since the refrigerants flowing in from the plurality of driving passages into the swirling space have velocity components in the directions in which the refrigerants flow along the outer circumference of the swirling space, the refrigerants flowing in into the swirling space can be swirled in the swirling space.

When viewed along the axial direction of the passage-forming member, since the refrigerants flowing in from the plurality of driving passages into the swirling space have the velocity components in directions different from each other, among velocity components of each refrigerant flowing in into the swirling space, velocity components in directions, which would cause swirl centers of refrigerants swirling in the swirling space to be deviated from the center axis of the swirling space, can cancel each other out.

Accordingly, it is possible to suppress large deviation between the swirl centers of the refrigerants swirling in the swirling space and the center axis of the swirling space, and refrigerants in a state of two-phase separation, in which liquid-phase refrigerants are unevenly distributed on an outer circumferential side and gas-phase refrigerants are unevenly distributed on an inner circumferential side, can flow into the nozzle passages that are formed on the outer circumferential side of the passage-forming member.

As a result, boiling of the refrigerants in the state of two-phase separation can be promoted in the nozzle passages, and energy conversion efficiency (corresponding to nozzle efficiency) when pressure energy of refrigerants is converted into kinetic energy in the nozzle passages can be improved. That is, according to the first aspect, in the ejector that depressurizes the refrigerants swirling in the swirling space, nozzle efficiency can be sufficiently improved.

A second aspect of the present disclosure is that, when viewed along the axial direction of the passage-forming member, refrigerant outlet ports of the plurality of driving passages to the swirling space are positioned at equal angle intervals around the center axis of the swirling space.

In the second aspect, the passage-forming member is not strictly limited to only the shape in which the sectional area gradually widens in a direction away from the depressurizing space. Since the passage-forming member includes a shape in which a sectional area of at least a portion of the passage-forming member radially gradually widens in the direction away from the depressurizing space, the passage-forming member may include a shape in which the diffuser passage widens toward the outside in a direction away from the depressurizing space.

"The passage-forming member being formed in a conical shape" is not limited to the passage-forming member being formed in a complete conical shape, and includes a shape similar to a cone or a shape in which a portion is formed in a conical shape. Specifically, a sectional shape in an axial direction is not limited to an isosceles triangle, and may include a shape that has two sides in a state where an apex is interposed between two sides that are convex toward the inner circumferential side, a shape that has two sides in a state where an apex is interposed between two sides that are convex toward the outer circumferential side, a shape in which the sectional shape is formed in a semicircular shape, or the like.

"Equal angle intervals" does not mean only the state where outflow ports are disposed at strictly equal angle intervals, and may include a state where the outflow ports are slightly deviated with respect to equal angles within a range in which large deviation between the swirl centers of refrigerants swirling in the swirling space and the center axis of the swirling space can be limited.

EMBODIMENTS FOR CARRYING OUT INVENTION

Figure 1:
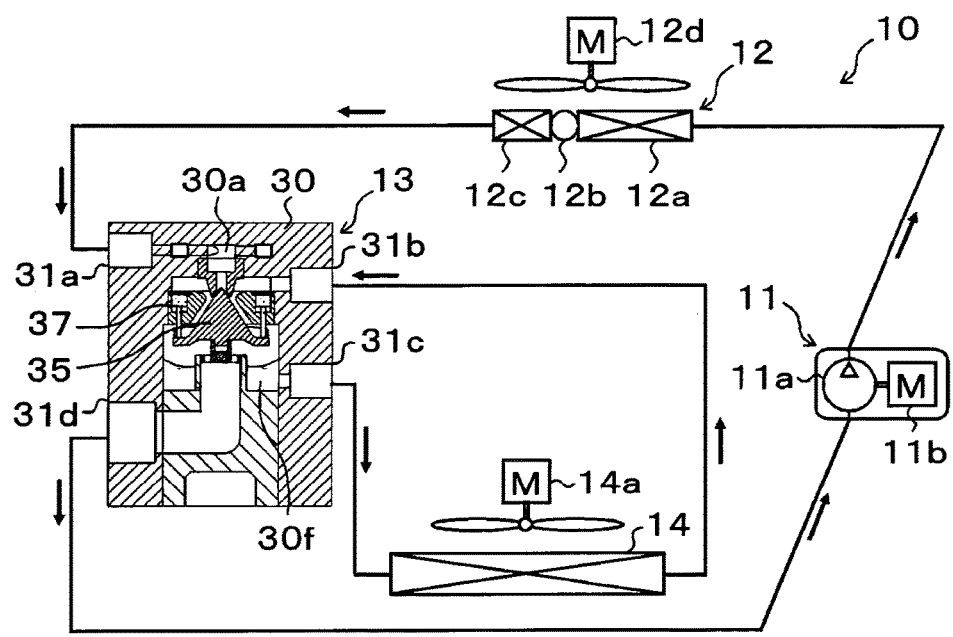
FIG. 1 is an overall configuration view of an ejector type refrigeration cycle of a first embodiment.

Hereinafter, multiple aspects for embodying the present disclosure will be described with reference to the drawings. In each aspect, the same reference numerals are assigned to portions corresponding to contents described in a preceding aspect, and overlapping explanations may be omitted. When a portion of a configuration in each aspect is described, other aspects described previously can be applied to other portions of the configuration. Not only portions which are specifically clarified so as to be combined in each embodiment are capable of being combined, but also embodiments are capable of being partially combined with each other even though combination is not clarified as long as no adverse effect is particularly generated with respect to the combination.

First, in Japanese Patent Application No. 2012-184950 (hereinafter, referred to as the earlier application example), the inventors suggest an ejector applied to an ejector type refrigeration cycle, including:

a body in which a swirling space through which a refrigerant that has flowed out from a radiator is swirled, a depressurizing space through which a refrigerant that has flowed out from the swirling space is depressurized, a suction-passage which communicates with a downstream side in a refrigerant flow of the depressurizing space and through which a refrigerant that has flowed out from an evaporator is drawn, and a pressurizing space in which a refrigerant sprayed from the depressurizing space and a refrigerant drawn from the suction-passage are mixed with each other and pressurized are provided, and a passage-forming member that includes at least a portion disposed inside the depressurizing space and the pressurizing space, and is formed in a conical shape in which a sectional area gradually widens in a direction away from the depressurizing space, in which a refrigerant passage that is provided between an inner circumferential surface of a portion of the body forming the depressurizing space and an outer circumferential surface of the passage-forming member forms a nozzle passage that functions as a nozzle through which the refrigerant that has flowed out from the swirling space is depressurized and sprayed, and a refrigerant passage that is provided between an inner circumferential surface of a portion of the body forming the pressurizing space and the outer circumferential surface of the passage-forming member forms a diffuser passage that functions as a diffuser that pressurizes a mixed refrigerant of the sprayed refrigerant and the drawn refrigerant.

In the ejector of this earlier application example, since a refrigerant is swirled in the swirling space, the pressure of the refrigerant of the center of the swirling side in the swirling space can be decreased to a pressure at which the refrigerant becomes a saturated liquid-phase refrigerant, or a pressure at which the refrigerant is depressurized and boiled (cavitation is generated). Accordingly, more gas-phase refrigerants exist on the inner circumferential side to a greater extent than the outer circumferential side of the swirl center axis, and a state of two-phase separation can be obtained, in which a refrigerant of a single-phase of gas exists in the vicinity of a swirl center line in the swirling space and a refrigerant of a single-phase of liquid exists around the swirl center line.

Since the refrigerant that is in a state of two-phase separation flows into the nozzle passage and boiling of the refrigerant is promoted by wall surface boiling and interface boiling, a gas-liquid mixed state in which gas and liquid are homogeneously mixed with each other is obtained in the vicinity of the minimum flow path area portion of the nozzle passage. The refrigerant in a gas-liquid mixed state is sealed (choked) in the vicinity of the minimum flow path area portion of the nozzle passage, and a flow velocity of the refrigerant in a gas-liquid mixed state is accelerated until the flow velocity becomes a two-phase sound velocity.

In this way, the refrigerant accelerated to the two-phase sound velocity becomes an ideal two-phase spray flow which is homogeneously mixed from the minimum flow path area portion of the nozzle passage to the downstream side, and the flow velocity can further increase. As a result, a decrease of energy conversion efficiency (corresponding to nozzle efficiency) when pressure energy of the refrigerant is converted into kinetic energy in the nozzle passage can be limited.

In the ejector of the earlier application example, the member formed in a conical shape is adopted as the passage-forming member, and the shape of the diffuser passage is formed so as to be widened along the outer circumference of the passage-forming member in accordance with a distance from the depressurizing space. Accordingly, an increase of dimensions in the axial direction of the diffuser passage is limited, and an increase in the volume of the entire ejector can be limited.

Therefore, according to the ejector of the earlier application example, even when variation in the load of the ejector type refrigeration cycle occurs without increasing a volume, a decrease in the energy conversion efficiency (corresponding to nozzle efficiency) in the nozzle passage can be limited.

Meanwhile, in order to further improve the energy conversion efficiency of the ejector, the inventors have reviewed the ejector of the earlier application example. As a result, in the ejector of the earlier application example, a decrease in the energy conversion efficiency in the nozzle passage is limited. However, the energy conversion efficiency may be lower than a described value.

The inventors have searched for the cause, and as a result, in the ejector of the earlier application example, even when the center axis of the swirling space formed in a shape of a rotating body and the center axis of the passage-forming member are coaxially disposed, since the refrigerant flows from one direction into the swirling space, the swirl center of the refrigerant swirling in the swirling space and the center axis of the swirling space are deviated from each other, and the inventors understood that the deviation was the cause.

The reason is because if the swirl center of the refrigerant swirling in the swirling space and the center axis of the swirling space are deviated from each other, a refrigerant in a state of two-phase separation, in which a liquid-phase refrigerant is unevenly distributed on the outer circumferential side and a gas-phase refrigerant is unevenly distributed on the inner circumferential side, is not capable of flowing into the nozzle passage. Accordingly, boiling of the refrigerant in the state of two-phase separation in the nozzle passage cannot be promoted.

In consideration of the above-described problems, objects of the following embodiments are to sufficiently improve nozzle efficiency in an ejector that depressurizes a refrigerant swirling in a swirling space.

(First Embodiment)

A first embodiment of the present disclosure will be described with reference to FIGS. 1 to 5. As shown in FIG. 1, an ejector 13 of this embodiment is applied to a vapor compression refrigeration cycle device including an ejector as a refrigerant depressurization device, that is, an ejector type refrigeration cycle 10. The ejector type refrigeration cycle 10 is applied to a vehicle air conditioning apparatus, and has a function which cools blast air blown into a vehicle interior which is a space to be air-conditioned.

In the ejector type refrigeration cycle 10, an HFC based refrigerant (specifically, R134a) is adopted as a refrigerant, and a subcritical refrigeration cycle in which a high pressure-side refrigerant pressure does not exceed a critical pressure of the refrigerant. Of course, an HFO based refrigerant (specifically, R1234yf) or the like may be adopted as a refrigerant. Refrigerator oil for lubricating a compressor 11 is mixed with the refrigerant, and a portion of the refrigerator oil circulates through the cycle along with the refrigerant.

In the ejector type refrigeration cycle 10, the compressor 11 draws the refrigerant, pressurizes until the refrigerant becomes a high-pressure refrigerant, and discharges the pressurized refrigerant. Specifically, the compressor 11 of this embodiment is an electric compressor that is configured to accommodate a fixed capacity type compression mechanism 11a and an electric motor 11b for driving the compression mechanism 11a in a single housing.

As the compression mechanism 11a, various compression mechanisms such as a scroll type compression mechanism or a vane type compression mechanism are capable of being adopted. Since the electric motor 11b controls an operation (a rotational speed) of the electric motor according to control signals output from a control device described below, any motor of an AC motor and a DC motor may be adopted.

The compressor 11 may be an engine drive type compressor that is driven by a rotation driving force transmitted via a pulley, a belt, or the like from a vehicle travel-engine. As this kind of engine drive type compressor, a variable capacity type compressor capable of adjusting a refrigerant discharging capacity by variation of a discharge capacity, or a fixed capacity type compressor that changes an operation rate of a compressor by connecting and disconnecting an electromagnetic clutch and adjusts a refrigerant discharging capacity are capable of being adopted.

A refrigerant inlet side of a condenser 12a of a radiator 12 is connected to a discharge port of the compressor 11. The radiator 12 is a radiation heat exchanger which performs heat exchange between a high-pressure refrigerant discharged from the compressor 11 and a vehicle outdoor air (outside air) blown by a cooling fan 12d, and cools a high-pressure refrigerant so as to radiate the refrigerant.

More specifically, the radiator 12 is a so-called subcooling condenser which includes the condenser 12a, a receiver portion 12b, and a subcooling portion 12c. The condenser 12a performs heat exchange between a high-pressure gas-phase refrigerant discharged from the compressor 11 and the outside air blown from the cooling fan 12d and radiates the high-pressure gas-phase refrigerant so as to condense the refrigerant. The receiver portion 12b separates gas and liquid of a refrigerant that has flowed out from the condenser 12a, and accumulates surplus liquid-phase refrigerants. The subcooling portion 12c performs heat exchange between a liquid-phase refrigerant that has flowed out from the receiver portion 12b and the outside air blown from the cooling fan 12d, and super-cools the liquid-phase refrigerant.

The cooling fan 12d is an electric blower in which a number of rotations (amount of blast air) is controlled by a control voltage output from the control device. A refrigerant inlet port 31a of an ejector 13 is connected to a refrigerant outlet side of the subcooling portion 12c of the radiator 12.

The ejector 13 has a function of a refrigerant depressurization device that depressurizes a high-pressure liquid-phase refrigerant in a subcooling state and flowed out from the radiator 12 and allows the refrigerant to flow to the downstream side. The ejector 13 has a function of a refrigerant circulation device (refrigerant transport device) that draws (transport) and circulates a refrigerant that has flowed out from an evaporator 14 described below by suction of a refrigerant stream sprayed at a high speed. The ejector 13 of this embodiment has a function of a gas-liquid separation device that separates gas and liquid of the depressurized refrigerant.

Figure 3:
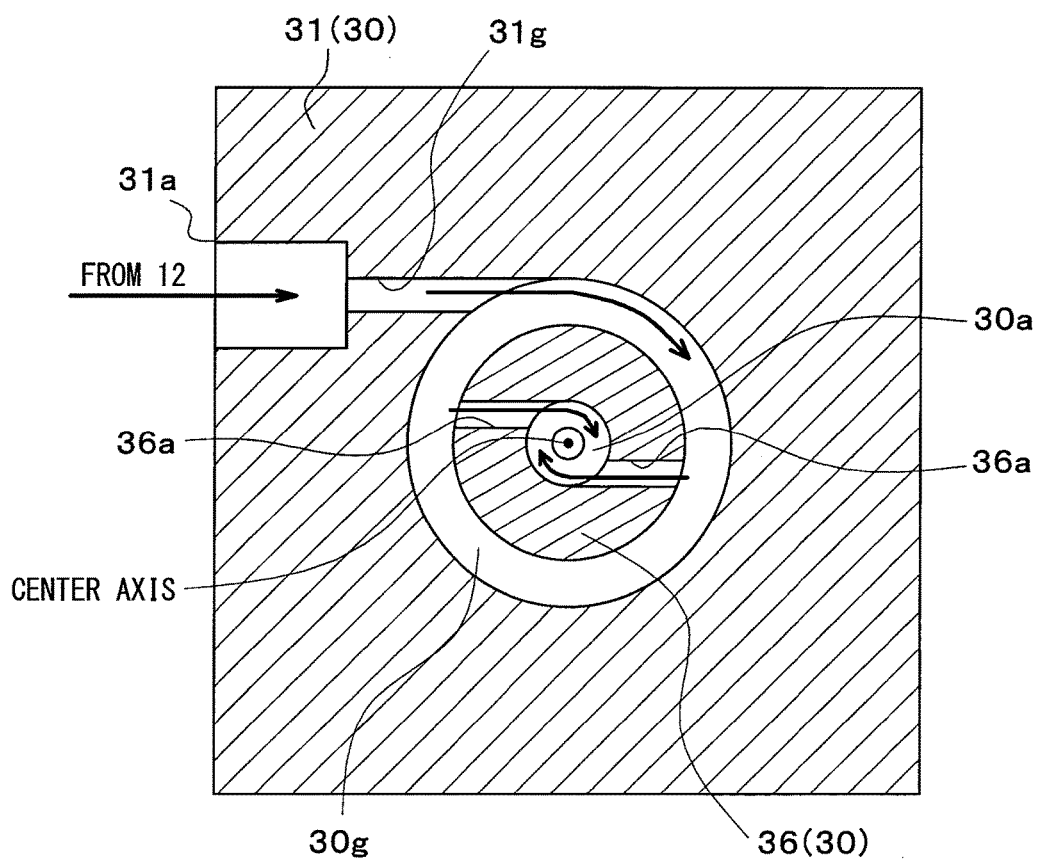
FIG. 3 is a cross-sectional view taken along III-III of FIG. 2.
Figure 4:
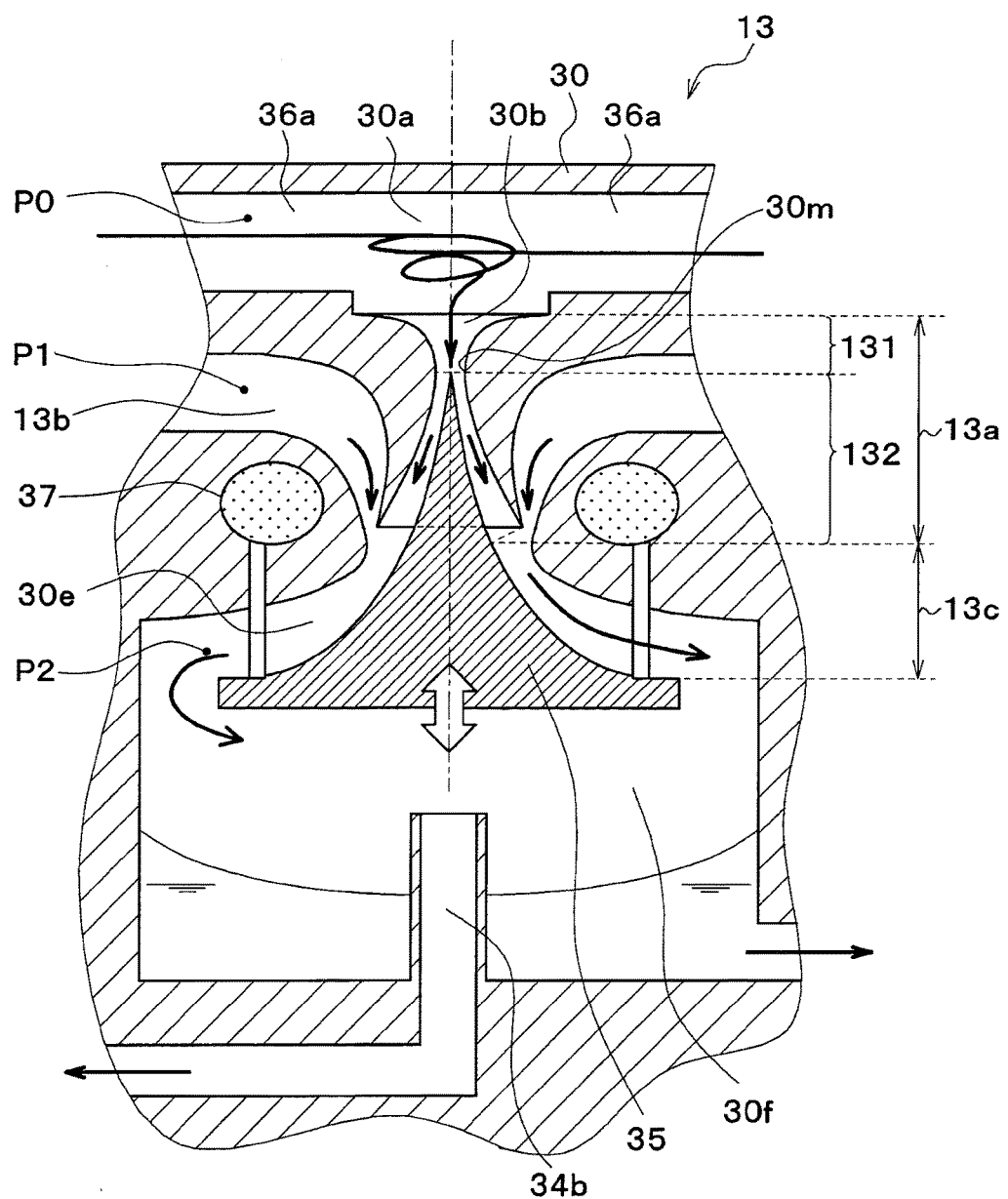
FIG. 4 is a schematic cross-sectional view for explaining a function of each refrigerant passage of the ejector of the first embodiment.

A specific configuration of the ejector 13 will be described with reference to FIGS. 2 to 4. Arrows shown by upper and lower in FIG. 2 indicate an upper direction and a lower direction in a state where the ejector type refrigeration cycle 10 is mounted on a vehicle air conditioning apparatus. FIG. 4 is a schematic cross-sectional view for explaining a function of each refrigerant passage of the ejector 13, and in FIG. 4, the same reference numerals are assigned to portions having the same functions as those of FIG. 2.

Figure 2:
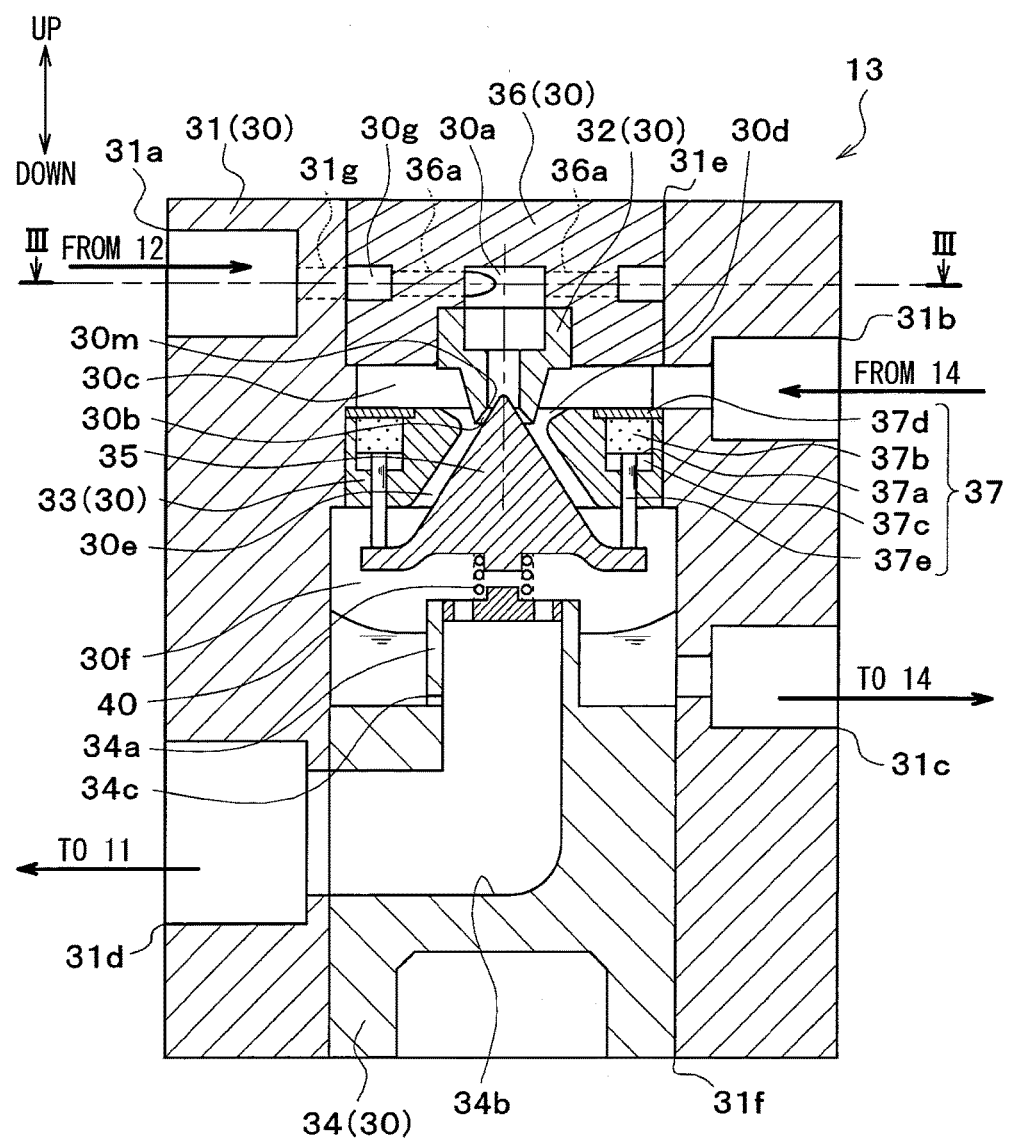
FIG. 2 is an axial cross-sectional view of an ejector of the first embodiment.

First, as shown in FIG. 2, the ejector 13 of this embodiment includes a body 30 that is configured by combining multiple constituent members. More specifically, the body 30 includes a housing body 31 which is formed in a square pillar shape or a column shape configured of metal, a resin, or the like and forms a shell of the ejector 13, as a constituent member. A nozzle body 32, a middle body 33, a lower body 34, an upper cover 36, or the like is fixed to the housing body 31.

A refrigerant inlet port 31a, a refrigerant suction port 31b, a liquid-phase refrigerant outlet port 31c, a gas-phase refrigerant outlet port 31d, or the like is provided in the housing body 31. The refrigerant that has flowed out from the radiator 12 flows into the ejector 13 through the refrigerant inlet port 31a. The refrigerant that has flowed out from the evaporator 14 is drawn by the refrigerant suction port 31b. A liquid-phase refrigerant, which is separated in a gas-liquid separation space 30f provided inside the body 30, flows to a refrigerant inlet side of the evaporator 14 through the liquid-phase refrigerant outlet port 31e. A gas-phase refrigerant, which is separated in the gas-liquid separation space 30f, flows to an intake side of the compressor 11 through the gas-phase refrigerant outlet port 31d.

An upper surface side fixing hole 31e, to which the upper cover 36 is inserted and fixed, is provided on an upper surface of the housing body 31. A lower surface side fixing hole 31f, to which the lower body 34 is inserted and fixed, is provided on a lower surface of the housing body 31.

The upper cover 36 is a cylindrical member having a bottom which is formed of metal, a resin, or the like. An outer circumferential surface of the upper cover 36 is fixed to the upper surface side fixing hole 31e provided in the housing body 31 by press fitting, a screw, or the like. The nozzle body 32 described below, which is formed of a metal member or the like which is tapered in a refrigerant flow direction and formed in an approximately conical shape, is fixed to a lower side of the upper cover 36 by press fitting or the like.

In an inner portion of the upper cover 36, a swirling space 30a, through which the refrigerant that has flowed in from the refrigerant inlet port 31a is swirled, is provided on an upper side of the nozzle body 32. The swirling space 30a is formed in a shape of a rotating body, and a center axis shown by a dashed line in FIGS. 2 and 4 extends in an up-down direction (vertical direction).

The shape of a rotating body is formed when a plane figure rotates around one straight line (center axis) on the same plane, and a cubic shape which is symmetrical about the center axis. More specifically, the swirling space 30a of this embodiment is an approximately column shape. The swirling space 30a may be formed in a shape or the like in which a cone, a truncated cone, or a column is combined to each other.

A rectangular section-shaped groove portion that is recessed toward an inner circumferential side is provided on a tubular side surface of the upper cover 36. More specifically, when viewed along an axial direction of the upper cover 36, the groove portion is annularly provided over the entire outer circumference of the upper cover 36. Accordingly, as shown in a cross-sectional view of FIG. 3, when the upper cover 36 is fixed to the housing body 31, an annular space is formed of the groove portion and an inner circumferential surface of the housing body 31.

In this embodiment, the annular space forms a distribution space 30g, and a refrigerant inflow passage 31g through which the refrigerant inlet port 31a and the distribution space 30g communicate with each other is provided in the housing body 31. Multiple (two in this embodiment) driving passages 36a, through which the distribution space 30g and the swirling space 30a communicate with each other, are provided in the upper cover 36.

Specifically, when viewed along a center axis direction of the swirling space 30a, the refrigerant inflow passage 31g extends in a tangential direction of an inner circumferential wall surface of a portion of the housing body 31 which forms the distribution space 30g. Accordingly, as shown by a thick solid line in FIG. 3, the refrigerant that has flowed from the refrigerant inflow passage 31g into the distribution space 30g flows along an inner circumferential wall surface of a portion of the body 30 which forms the distribution space 30g, and swirls in the swirling space 30a.

In this embodiment, in this way, the refrigerant that has flowed into the distribution space 30g swirls around the center axis of the swirling space 30a, and a state of the refrigerant in the distribution space 30g is homogenized. The state of the refrigerant being homogenized means that pressures of the refrigerant in the distribution space 30g are the same as one another at any position, and the states of the refrigerant in the distribution space 30g are the same as one another at any position.

As described above, in this embodiment, since the refrigerant that has flowed out from the radiator 12 as a subcooling condenser flows into the refrigerant inlet port 31a, the state of the refrigerant in the distribution space 30g is substantially a subcooled liquid phase state. However, even when air bubbles are mixed with the refrigerant in the distribution space 30g due to some reasons, since the refrigerant in the distribution space 30g is swirled, gas-liquid phase ratios of the refrigerant in the distribution space 30g can be the same as one another.

That is, the distribution space 30g of this embodiment has a function that causes the refrigerant to be distributed from the distribution space 30g into the multiple driving passages 36a in a similar state as one another. Of course, if the state of the refrigerant in the distribution space 30g can be homogenized, it is not necessary to swirl the refrigerant in the distribution space 30g around the axis.

When viewed along the center axis direction of the swirling space 30a, all of multiple (two in this embodiment) driving passages 36a extend in tangential directions of inner circumferential wall surfaces of the portions of the upper cover 36 and the nozzle body 32, both of which form the swirling space 30a. Accordingly, as shown in thick solid lines of FIG. 3, the refrigerant that has flowed from the refrigerant inflow passage 31g into the swirling space 30a flows along an inner circumferential wall surface of a portion of the body 30 that forms the swirling space 30a and is swirled in the swirling space 30a.

In other words, when viewed along the center axis direction of the swirling space 30a, the refrigerant flowing in from each driving passage 36a into the swirling space 30a has a velocity component in a direction in which the refrigerant flows along an outer circumference of the swirling space 30a.

When viewed along the center axis direction of the swirling space 30a, refrigerant outlets (refrigerant outlet ports) of the driving passages 36a on sides of the swirling space 30a are opened at equal angle intervals (180° interval in this embodiment) to one another around the center axis. Accordingly, the refrigerants flowing in from the multiple driving passages 36a into the swirling space 30a have the velocity components in the directions in which the refrigerants flow along the outer circumference of the swirling space 30a and the velocity components are also in directions different from each other. In other words, inflow directions of the refrigerants when the refrigerants flow in from the driving passages 36a into the swirling space 30a are different from each other (are opposite to each other in this embodiment) in the direction along the outer circumference of the swirling space 30a.

When viewed along the center axis direction of the swirling space 30a, it is not necessary to form the multiple driving passages 36a so as to be completely coincident with the tangential direction of the swirling space 30a. As long as the refrigerants flowing in from the driving passages 36a into the swirling space 30a have velocity components in directions in which the refrigerants flow along the outer circumference of the swirling space 30a, the multiple driving passages 36a may be provided so as to have velocity components (for example, an axial direction component of the swirling space 30a) in a direction other than the tangential direction.

Since a centrifugal force acts on a refrigerant that swirls in the swirling space 30a, a refrigerant pressure on the center axis side in the swirling space 30a is lower than a refrigerant pressure on the outer circumferential side. Accordingly, in this embodiment, at the time of a normal operation of the ejector type refrigeration cycle 10, the refrigerant pressure on the center axis side in the swirling space 30a is decreased to a pressure at which the refrigerant becomes a saturated liquid-phase refrigerant, or a pressure at which the refrigerant is depressurized and boiled (cavitation is generated).

This adjustment of the refrigerant pressure on the center axis side in the swirling space 30a can be realized by adjusting a swirl flow velocity of a refrigerant swirling in the swirling space 30. For example, adjustment of the swirling velocity can be performed by adjusting an area ratio between a total of passage sectional areas of the multiple driving passages 36a and a sectional area perpendicular to the axial direction of the swirling space 30a. The swirling velocity of this embodiment means a flow velocity in a swirl direction of a refrigerant in the vicinity of the outermost circumferential portion of the swirling space 30a.

A depressurizing space 30b, through which the refrigerant that has flowed out from the swirling space 30a is depressurized and flows to the downstream side, is provided inside the nozzle body 32. The depressurizing space 30b is formed in a shape of a rotating body in which a column-shaped space and a truncated cone-shaped space that is gradually widened in a refrigerant flow direction continuously from the lower side of the column-shaped space are combined to each other, and a center axis of the depressurizing space 30b is disposed coaxially with the center axis of the swirling space 30a.

In the depressurizing space 30b, a minimum passage area portion 30m in which a refrigerant passage area is reduced most in the depressurizing space 30b is provided, and a passage-forming member 35 that changes a passage area of the minimum passage area portion 30m is disposed. The passage-forming member 35 is formed in an approximately cone shape which gradually widens toward a downstream side of a refrigerant flow, and a center axis of the passage-forming member 35 is disposed coaxially with the center of the depressurizing space 30b. In order words, the passage-forming member 35 is formed in a cone shape in which the sectional area widens in a direction away from the depressurizing space 30*b*.

As shown in FIG. 4, a tapered portion 131 and an end-widened portion 132 are provided as a refrigerant passage that is provided between an inner circumferential surface of a portion of the nozzle body 32 forming the depressurizing space 30*b* and an outer circumferential surface of an upper side of the passage-forming member 35. The tapered portion 131 is provided on the upstream side of the minimum passage area portion 30*m* in the refrigerant flow, and a refrigerant passage area of the tapered portion 131 is gradually reduced until the minimum passage area portion 30*m*. The end-widened portion 132 is provided on the downstream side of the minimum passage area portion 30*m* in the refrigerant flow, and a refrigerant passage area of the end-widened portion 132 gradually increases.

In the downstream side of the tapered portion 131 and the end-widened portion 132, since the depressurizing space 30*b* and the passage-forming member 35 overlap each other when viewed along a radial direction, a sectional shape of a refrigerant passage perpendicular to an axial direction is formed in an annular shape (a doughnut shape in which a smaller circular shape coaxially disposed with a larger circular shape is excluded from the larger circular shape).

In this embodiment, the inner circumferential surface of the portion of the nozzle body 32 forming the depressurizing space 30*b* and the outer circumferential surface of the passage-forming member 35 are provided so that a refrigerant passage area of the end-widened portion 132 gradually widens toward the downstream side of the refrigerant flow.

In this embodiment, a refrigerant passage provided between an inner circumferential surface of the depressurizing space 30*b* and the outer circumferential surface of the apex side of the passage-forming member 35 by the above-described passage shape is a nozzle passage 13*a* which functions as a nozzle. In the nozzle passage 13*a*, the refrigerant is depressurized and is sprayed in a state where a flow velocity of the refrigerant in a gas-liquid two phase state increases so as to be higher than a two-phase sound velocity.

In this embodiment, as shown in FIG. 4, the refrigerant passage provided between the inner circumferential surface of the depressurizing space 30*b* and the outer circumferential surface on the apex side of the passage-forming member 35 is a refrigerant passage which is provided to include a range within which a line extending in a normal direction from the outer circumferential surface of the passage-forming member 35 crosses a portion of the nozzle body 32 forming the depressurizing space 30*b*.

Since the refrigerant that flows into the nozzle passage 13*a* is swirled in the swirling space 30*a*, a refrigerant that flows through the nozzle passage 13*a* and a refrigerant that is sprayed from the nozzle passage 13*a* have velocity components of the refrigerants swirling in the same direction as the swirl direction of the refrigerant swirling in the swirling space 30*a*.

As shown in FIG. 2, in the middle body 33, a through hole that penetrates through the front surface and the rear surface in a center portion of the middle body 33 and has a shape of a rotating body is provided, and the middle body 33 is formed in a metal disk-shaped member that accommodates a driving portion 37 which displaces the passage-forming member 35 on the outer circumferential side of the through hole. A center axis of the through hole of the middle body 33 is disposed coaxially with the center axes of the swirling space 30*a* and the depressurizing space 30*b*. The middle body 33 is fixed to the lower side of the nozzle body 32 in the inner portion of the housing body 31, by press fitting or the like.

An inflow space 30*c*, in which a refrigerant that has flowed in from the refrigerant suction port 31*b* stays, is provided between an upper surface of the middle body 33 and an inner wall surface of the housing body 31 opposing the upper surface. In this embodiment, since a tapered tip portion 32*a* of the lower side of the nozzle body 32 is positioned inside the through hole of the middle body 33, when viewed along the center axis directions of the swirling space 30*a* and the depressurizing space 30*b*, the inflow space 30*c* is formed in an annular section.

When viewed along the center axis direction of the inflow space 30*c*, a drawn refrigerant inflow passage, with which the refrigerant suction port 31*b* and the inflow space 30*c* are connected, extends in a tangential direction of an inner circumferential wall surface of the inflow space 30*c*. Accordingly, in this embodiment, the refrigerant that has flowed from the refrigerant suction port 31*b* into the inflow space 30*c* via the drawn refrigerant inflow passage swirls in the same direction as the direction in which the refrigerant in the swirling space 30*a* swirls.

In a range in which the lower side of the nozzle body 32 is inserted into the through hole of the middle body 33, that is, in a range in which the middle body 33 and the nozzle body 32 overlap each other when viewed along a radial direction perpendicular to an axis line, the refrigerant passage area is gradually reduced toward the refrigerant flow direction so as to match the outer circumferential shape of the tapered tip portion 32*a* of the nozzle body 32.

Accordingly, a suction-passage 30*d*, through which the inflow space 30*c* and the downstream side of the depressurizing space 30*b* in the refrigerant flow communicate with each other, is provided between the inner circumferential surface of the through hole and the outer circumferential surface of the tapered tip portion 32*a* on the lower side of the nozzle body 32. That is, in this embodiment, a suction-passage 13*b* that draws a refrigerant from the outside is formed of the drawn refrigerant inflow passage which connects the refrigerant suction port 31*b* and the inflow space 30*c*, the inflow space 30*c*, and the suction-passage 30*d*.

A section perpendicular to a center axis of the suction-passage 30*d* is also formed in an annular shape, and a refrigerant flowing through the suction-passage 30*d* also has a velocity component of the refrigerant swirling in the same direction as the swirl direction of the refrigerant swirling in the swirling space 30*a*. A refrigerant outlet (specifically, a refrigerant outlet of the suction-passage 30*d*) of the suction-passage 13*b* is annularly opened to an outer circumferential side of a refrigerant outlet (refrigerant spray port) of the nozzle passage 13*a*.

A pressurizing space 30*e*, which is formed in an approximately truncated cone shape which is gradually widened toward the refrigerant flow direction, is provided on the downstream side of the suction-passage 30*d* in the refrigerant flow in the through hole of the middle body 33. The pressurizing space 30*e* is a space into which a refrigerant sprayed from the depressurizing space 30*b* (specifically, nozzle passage 13*a*) and a refrigerant drawn from the suction-passage 13*b* flow.

A lower portion of the above-described passage-forming member 35 is disposed inside the pressurizing space 30*e*. Since a spreading angle of a cone-shaped side surface of the passage-forming member 35 in the pressurizing space 30*e* is smaller than a spreading angle of the truncated cone-shaped space of the pressurizing space 30*e*, a refrigerant passage area of the refrigerant passage gradually increases toward the downstream side in the refrigerant flow.

In this embodiment, in this way, since the refrigerant passage area increases, as shown in FIG. 4, a refrigerant passage which is provided between the inner circumferential surface of the middle body 33 forming the pressurizing space 30e and the outer circumferential surface on the lower side of the passage-forming member 35 is a diffuser passage 13c which functions as a diffuser. In the diffuser passage 13c, kinetic energy of a mixed refrigerant of the sprayed refrigerant and the drawn refrigerant is converted into pressure energy.

A sectional shape perpendicular to an axial direction of the diffuser passage 13c is also formed in an annular shape, and a refrigerant flowing through the diffuser passage 13c also has a velocity component of the refrigerant swirling in the same direction as the swirl direction of the refrigerant swirling in the swirling space 30a due to the velocity component in the swirl direction of the refrigerant sprayed from the nozzle passage 13a and the velocity component in the swirl direction of the refrigerant drawn from the suction-passage 13b.

Next, a driving portion 37 which is disposed inside the middle body 33 and displaces the passage-forming member 35 will be described. The driving portion 37 is configured to include a thin disk-shaped diaphragm 37a serving as a pressure responsive member. More specifically, as shown in FIG. 2, the diaphragm 37a is fixed by welding or the like to divide a column-shaped space provided on the outer circumferential side of the middle body 33 into two upper and lower spaces.

The upper (inflow space 30c side) space of two spaces divided by the diaphragm 37a configures a sealed space 37b in which a temperature sensitive medium in which a pressure is changed according to a temperature of a refrigerant flowing out from the evaporator 14 is sealed. A temperature sensitive medium having the same composition as that of the refrigerant circulating through the ejector type refrigeration cycle 10 is sealed in the sealed space 37b at predetermined density. Accordingly, in this embodiment, the temperature sensitive medium becomes R134a.

Meanwhile, the lower space of two spaces divided by the diaphragm 37a configures an introduction space 37c into which the refrigerant flowing out from the evaporator 14 is introduced via a communication passage (not shown). Accordingly, a temperature of the refrigerant flowing out from the evaporator 14 is transmitted to the temperature sensitive medium sealed in the sealed space 37b via a cover member 37d interposed between the inflow space 30c and the sealed space 37b, the diaphragm 37a, or the like.

As clearly shown in FIGS. 2 and 4, the suction-passage 13b is disposed on the upper side of the middle body 33 of this embodiment, and the diffuser passage 13c is disposed on the lower side of the middle body 33. Accordingly, when viewed along a radial direction of the center axis, at least a portion of the driving portion 37 is disposed at a position which is vertically interposed between the suction-passage 13b and the diffuser passage 13c.

More specifically, when viewed along the center axis direction of the swirling space 30a, the passage-forming member 35, or the like, the sealed space 37b of the driving portion 37 is disposed at a position which is surrounded by the suction-passage 13b and the diffuser passage 13c in a position at which the suction-passage 13b and the diffuser passage 13c overlap each other. Accordingly, the temperature of the refrigerant flowing out from the evaporator 14 is transmitted to the sealed space 37b, and an inner pressure in the sealed space 37b becomes a pressure corresponding to the temperature of the refrigerant flowing out from the evaporator 14.

The diaphragm 37a is deformed according to a differential pressure between the inner pressure in the sealed space 37b and the pressure of the refrigerant that flows into the introduction space 37c and flows out from the evaporator 14. Accordingly, preferably, the diaphragm 37a is formed of a tough material having sufficient elasticity and improved thermal conduction, and for example, preferably, the diaphragm 37a is formed of a metal thin plate such as stainless steel (SUS304).

An upper end side of a column-shaped actuating bar 37e is joined to a center portion of the diaphragm 37a using welding or the like, and an outer circumferential side of the lowermost side (bottom portion) of the passage-forming member 35 is fixed to a lower end side of the actuating bar 37e. Accordingly, the diaphragm 37a and the passage-forming member 35 are connected to each other, the passage-forming member 35 is displaced according to displacement of the diaphragm 37a, and the refrigerant passage area (a passage sectional area in the minimum passage area portion 30m) of the nozzle passage 13a is adjusted.

Specifically, when the temperature (degree of superheat) of the refrigerant flowing out from the evaporator 14 increases, a saturated pressure of the temperature sensitive medium sealed in the sealed space 37b increases, and a differential pressure, which is obtained by subtracting the pressure of the introduction space 37c from the inner pressure of the sealed space 37b, increases. Accordingly, the diaphragm 37a displaces the passage-forming member 35 in a direction (a lower side in a vertical direction) in which a passage sectional area of the minimum passage area portion 30m increases.

Meanwhile, when the temperature (degree of superheat) of the refrigerant flowing out from the evaporator 14 decreases, a saturated pressure of the temperature sensitive medium sealed in the sealed space 37b decreases, and a differential pressure, which is obtained by subtracting the pressure of the introduction space 37c from the inner pressure of the sealed space 37b, decreases. Accordingly, the diaphragm 37a displaces the passage-forming member 35 in a direction (an upper side in a vertical direction) in which a passage sectional area of the minimum passage area portion 30m decreases.

In this way, the diaphragm 37a displaces the passage-forming member 35 in the vertical direction according to a degree of superheat of the refrigerant flowing out from the evaporator 14, and the passage sectional area of the minimum passage area portion 30m can be adjusted so that the degree of superheat of the refrigerant flowing out from the evaporator 14 approaches a predetermined value. A gap between the actuating bar 37e and the middle body 33 is sealed by a seal member such as an O-ring (not shown), and a refrigerant does not leak from the gap even when the actuating bar 37e is displaced.

A bottom surface of the passage-forming member 35 receives a load of a coil spring 40 that is fixed to a lower body 34. The coil spring 40 applies a load, which biases the passage-forming member 35 toward a side (the upper side in FIG. 2) in which the passage sectional area is reduced in the minimum passage area portion 30m. By adjusting the load, a valve open pressure of the passage-forming member 35 is changed, and a target degree of superheat can be changed.

In this embodiment, multiple (specifically, two) column-shaped spaces are provided on the outer circumferential side of the middle body 33, each thin disk-shaped diaphragm 37a is fixed to each of the inner portions of the spaces, and two driving portions 37 are configured. However, the number of the driving portions 37 is not limited to this. When the driving portions 37 are provided at multiple locations, preferably, the driving portions are disposed on the center axes at equal angle intervals.

A diaphragm formed of an annular thin plate is fixed to a space which is annularly formed when viewed along an axial direction, and the diaphragm and the passage-forming member 35 are connected to each other by multiple actuating bars.

Next, the lower body 34 is formed of a column-shaped metal member or the like, and is fixed to the lower surface side fixing hole 31f provided on a bottom surface of the housing body 31, using press fitting, screwing, or the like. The gas-liquid separation space 30f, in which gas and liquid of the refrigerant that has flowed from the diffuser passage 13c are separated, is provided between an upper surface side of the lower body 34 and a bottom surface side of the middle body 33 in an internal space of the housing body 31.

The gas-liquid separation space 30f is formed in a space having a shape of an approximately column-shaped rotating body, and a center axis of the gas-liquid separation space 30f is also disposed coaxially with the center axis of the swirling space 30a, the depressurizing space 30b, the passage-forming member 35, or the like.

As described above, the refrigerant, which flows out from the diffuser passage 13c and flows into the gas-liquid separation space 30f, has the velocity component of the refrigerant swirling in the same direction as the swirl direction of the refrigerant swirling in the swirling space 30a. Accordingly, gas and liquid of the refrigerant in the gas-liquid separation space 30f are separated by action of a centrifugal force.

A cylindrical pipe 34a, which is disposed coaxially with the center axis of the gas-liquid separation space 30f and extends upward, is provided in a center portion of the lower body 34. A liquid-phase refrigerant, which is separated in the gas-liquid separation space 30f, is temporarily stored in an outer circumferential side of the pipe 34a. A gas-phase refrigerant outflow passage 34b, through which a gas-phase refrigerant separated in the gas-liquid separation space 30f is introduced into the gas-phase refrigerant outlet port 31d, is provided inside the pipe 34a.

The above-described coil spring 40 is fixed to an upper end of the pipe 34a. The coil spring 40 has a function of a vibration buffering member which dampens vibration of the passage-forming member 35 generated due to pressure pulsation when a refrigerant is depressurized. An oil return hole 34c, through which a refrigerator oil in the liquid-phase refrigerant is returned into the compressor 11 via the gas-phase refrigerant outflow passage 34b, is provided on a base portion (lowermost portion) of the pipe 34a.

As shown in FIG. 1, an inlet side of the evaporator 14 is connected to the liquid-phase refrigerant outlet port 31c of the ejector 13. The evaporator 14 is a heat absorption-heat exchanger that evaporates a low-pressure refrigerant by performing heat exchange between a low-pressure refrigerant depressurized by the ejector 13 and blast air blown into a vehicle interior from a blower fan 14a, and exerts heat absorbing effect.

The blower fan 14a is an electric blower in which a number of rotations (amount of blast air) is controlled by a control voltage output from the control device. The refrigerant suction port 31b of the ejector 13 is connected to an outlet side of the evaporator 14. An intake side of the compressor 11 is connected to the gas-phase refrigerant outlet port 31d of the ejector 13.

Next, the control device (not shown) is configured of a well-known microcomputer including a CPU, a ROM, a RAM, or the like, and peripheral circuits thereof. The control device performs various calculations and various processing based on control programs stored in the ROM, and controls operations of various electric actuators 11b, 12d, and 14a.

An air conditioning control sensor group including an inside air temperature sensor that detects a vehicle interior temperature, an outside air temperature sensor that detects an outside air temperature, a solar sensor that detects an amount of solar radiation of a vehicle interior, an evaporator temperature sensor that detects a blow-out air temperature (evaporator temperature) of the evaporator 14, an outlet side temperature sensor that detects a temperature of an outlet side refrigerant of the radiator 12, an outlet side pressure sensor that detects a pressure of an outlet side refrigerant of the radiator 12, or the like is connected to the control device, and detected values of the sensor group are input to the control device.

An operation panel (not shown) that is disposed in the vicinity of a dashboard panel positioned at the front portion in the vehicle interior is connected to an input side of the control device, and operation signals from various operation switches provided on the operation panel are input to the control device. As various operation switches provided on the operation panel, an air conditioning operation switch that performs air conditioning of a vehicle interior, a vehicle interior temperature setting switch that sets a vehicle interior temperature, or the like is provided.

In control devices of this embodiment, control devices which control operations of various control target devices connected to the output side are integrally configured. However, in the control devices, configurations (software and hardware) which control the operation of each control target device configure the control device of each control target device. For example, in this embodiment, the configuration (hardware and software) which controls an operation of the electric motor 11b of the compressor 11 configures a discharge capability control device.

An operation of this embodiment in the above-described configuration will be described with reference to a Mollier diagram of FIG. 5. A vertical axis of the Mollier diagram indicates pressures corresponding to P0, P1, and P2 of FIG. 3. First, when an operation switch of an operation panel is turned on, the control device operates the electric motor 11b of the compressor 11, the cooling fan 12d, the blower fan 14a, or the like. Accordingly, the compressor 11 draws, compresses, and discharges a refrigerant.

A gas-phase refrigerant (a5 point of FIG. 5), which is discharged from the compressor 11 and is in a high-temperature and high-pressure state, flows into the condenser 12a of the radiator 12, the refrigerant performs heat exchange with blast air (outside air) blown from the cooling fan 12d so as to be radiated, and the refrigerant is condensed. Gas and liquid of the refrigerant radiated by the condenser 12a are separated by the receiver portion 12b. A liquid-phase refrigerant, which has been subjected to gas-liquid separation by the receiver portion 12b, performs heat exchange with blast air blown from the cooling fan 12d by the subcooling portion 12c, and becomes a subcooled liquid-phase refrigerant which is further radiated (a5 point→b5 point in FIG. 5).

Figure 5:
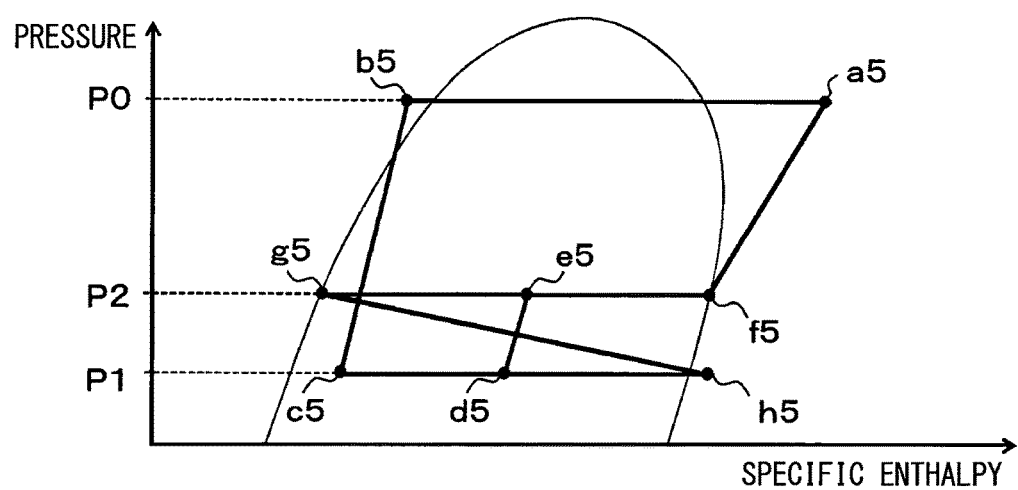
FIG. 5 is a Mollier diagram showing a state of a refrigerant in the ejector type refrigeration cycle of the first embodiment.

The subcooled liquid-phase refrigerant that has flowed out from the subcooling portion 12c of the radiator 12, is depressurized and sprayed in iso-entropy in the nozzle passage 13a which is provided between the inner circumferential surface of the depressurizing space 30b of the ejector 13 and the outer circumferential surface of the passage-forming member 35 (b5 point→c5 point in FIG. 5). In this case, the refrigerant passage area in the minimum passage area portion 30m of the depressurizing space 30b is adjusted so that a degree of superheat of an outlet side refrigerant of the evaporator 14 approaches a predetermined value.

The refrigerant that has flowed out from the evaporator 14 is drawn via the refrigerant suction port 31b and the suction-passage 13b (more specifically, inflow space 30c and suction-passage 30d) by suction of the refrigerant sprayed from the nozzle passage 13a. The refrigerant sprayed from the nozzle passage 13a and the refrigerant drawn via the suction-passage 13b or the like flow into a mixing passage 13d, and are mixed with each other (c5 point→d5 point, and h5 point→d5 point in FIG. 5).

The refrigerant mixed by the mixing passage 13d flows into the diffuser passage 13c. In the diffuser passage 13c, kinetic energy of the refrigerant is converted into pressure energy by an increase of a refrigerant passage area. Accordingly, a pressure of the mixed refrigerant increases while the sprayed refrigerant and the drawn refrigerant are mixed with each other (d5 point→e5 point in FIG. 5). Gas and liquid of the refrigerant that has flowed out from the diffuser passage 13c are separated by the gas-liquid separation space 30f (e5 point→f5 point and e5 point→g5 point in FIG. 5).

A liquid-phase refrigerant separated in the gas-liquid separation space 30f flows out from the liquid-phase refrigerant outlet port 31c and flows into the evaporator 14. The refrigerant which has flowed into the evaporator 14 absorbs heat from blast air blown by the blower fan 14a, is evaporated, and cools the blown air (g5 point→h5 point in FIG. 5). Meanwhile, the gas-phase refrigerant separated in the gas-liquid separation space 30f flows out from the gas-phase refrigerant outlet port 31d, enters the compressor 11, and is compressed again (f5 point→a5 point in FIG. 5).

The ejector type refrigeration cycle 10 of this embodiment is operated as described above, and is capable of cooling blast air blown to the vehicle interior. In the ejector type refrigeration cycle 10, since a refrigerant pressurized through the diffuser passage 13 enters the compressor 11, a drive power of the compressor 11 decreases, and a coefficient of performance (COP) of a cycle can be improved.

According to the ejector 13 of this embodiment, since a refrigerant is swirled in the swirling space 30a, a refrigerant pressure on the center of the swirling side in the swirling space 30a can be decreased to a pressure at which the refrigerant becomes a saturated liquid-phase refrigerant, or a pressure at which the refrigerant is depressurized and boiled (cavitation is generated). Accordingly, more gas-phase refrigerants exist on the inner circumferential side than the outer circumferential side of the swirl center axis, and a state of two-phase separation can be obtained, in which a refrigerant of a single-phase of gas exists in the vicinity of a swirl center line in the swirling space 30a and a refrigerant of a single-phase of liquid exists around the swirl center line.

The refrigerant, which has been in the state of two-phase separation as described above, flows into the nozzle passage 13a, and in the tapered portion 131 of the nozzle passage 13a, boiling of the refrigerant is promoted due to wall surface boiling generated when the refrigerant is separated from the outer circumferential side wall surface of the annular refrigerant passage, interface boiling of boiling cores generated by cavitation of the refrigerant on the center axis side of the annular refrigerant passage, or the like. Accordingly, the refrigerant that flows into the minimum passage area portion 30m of the nozzle passage 13a approaches a gas-liquid mixed state in which gas and liquid are homogeneously mixed with each other.

Sealing (chocking) is generated in a flow of a refrigerant which has been in the gas-liquid mixed state in the vicinity of the minimum passage area portion 30m, and the refrigerant in the gas-liquid mixed state that reaches the sound velocity due to the choking is accelerated by the end-widened portion 132 and is sprayed. In this way, since the refrigerant in the gas-liquid mixed state is capable of being efficiently accelerated due to promotion of boiling such as both the wall surface boiling and the interface boiling until a speed of the refrigerant reaches the sound velocity, energy conversion efficiency (corresponding to nozzle efficiency in the related art) in the nozzle passage 13a can be improved.

In this case, in the ejector 13 of this embodiment, when viewed along the axial direction of the swirling space 30a (that is, the axial direction of the passage-forming member 35), the refrigerants flowing in from the multiple driving passages 36a into the swirling space 30a have the velocity components in the directions in which the refrigerants flow along the outer circumference of the swirling space 30a and velocity components are also in directions different from each other.

Accordingly, among velocity components of the refrigerants flowing in from the driving passages 36a into the swirling space 30a, velocity components in directions, which cause swirl centers of the refrigerants that swirl in the swirling space 30a to be deviated from the center axis of the swirling space 30a, can cancel each other out. It is possible to suppress of occurrence of large deviation between the swirl centers of the refrigerants that swirl in the swirling space 30a and the center axis of the swirling space 30a.

In this embodiment, when viewed along the axial direction of the passage-forming member 35, since the refrigerant outlet ports of the multiple driving passages 36a are opened at equal angle intervals to one another around the axis of the passage-forming member 35, occurrence of large deviation between the swirl centers of the refrigerants that swirl in the swirling space 30a and the center axis of the swirling space 30a can be surely suppressed.

Accordingly, refrigerants, which are in a state of two-phase separation in which liquid-phase refrigerants are unevenly distributed on the outer circumferential side and gas-phase refrigerants are unevenly distributed on the inner circumferential side, are capable of flowing into the nozzle passages 13a that are provided on the outer circumferential side of the passage-forming member 35. As a result, boiling of the refrigerants in the state of two-phase separation can be promoted in the nozzle passages 13a, and energy conversion efficiency (corresponding to the nozzle efficiency in the related art) when pressure energy of refrigerants is converted into kinetic energy in the nozzle passages can be improved.

The refrigerant outlet ports of the multiple driving passages 36a are not necessarily strictly disposed at equal angle intervals, and may be disposed within a range in which large deviation between the swirl center of the refrigerant swirling in the swirling space 30a and the center axis of the swirling space 30a can be limited.

In the ejector 13 of this embodiment, since the distribution space 30g is provided, states of the refrigerants can be distributed into the driving passages 36a in a similar state as each other. Accordingly, the states of the refrigerants flowing in from the driving passages 36a into the swirling space 30a become a similar state as each other, and occurrence of the large deviation between the swirl center of the refrigerant swirling in the swirling space 30a and the center axis of the swirling space 30a can be further effectively suppressed.

In the ejector 13 of this embodiment, since the distribution space 30g is a groove portion formed on the tubular side surface of the upper cover 36, the distribution space 30g can be easily formed.

Since the distribution space 30g is annularly formed radially outward of the swirling space 30a, for example, when the upper cover 36 is fixed to the upper surface side fixing hole 31e of the housing body 31, even in a case where an attachment position of the upper cover 36 is deviated in the circumferential direction with respect to the center axis, the refrigerant inflow passage 31g and the distribution space 30g can certainly communicate with each other.

According to the ejector 13 of this embodiment, since the driving portion 37 is provided, the passage-forming member 35 is displaced according to load variation of the ejector type refrigeration cycle 10, and refrigerant passage areas of the nozzle passage 13a and the diffuser passage 13c can be adjusted. Accordingly, the ejector 13 can be appropriately operated according to load variation of the ejector type refrigeration cycle 10.

In the body 30 of the ejector 13 of this embodiment, since the gas-liquid separation space 30f in which gas and liquid of the refrigerant that has flowed out from the diffuser passage 13c are separated from each other is provided, unlike a case where a gas-liquid separation device is provided in addition to the ejector 13, a capacity of the gas-liquid separation space 30f can be effectively decreased.

That is, in the gas-liquid separation space 30f of this embodiment, since the refrigerant that flows out from the diffuser passage 13c formed in an annular section has velocity components in the swirl direction in advance, a space for generating a swirl flow of a refrigerant in the gas-liquid separation space 30f is not required. Accordingly, unlike a case where the gas-liquid separation device is provided in addition to the ejector 13, a capacity of the gas-liquid separation space 30f can be effectively decreased.

(Second Embodiment)

Figure 6:
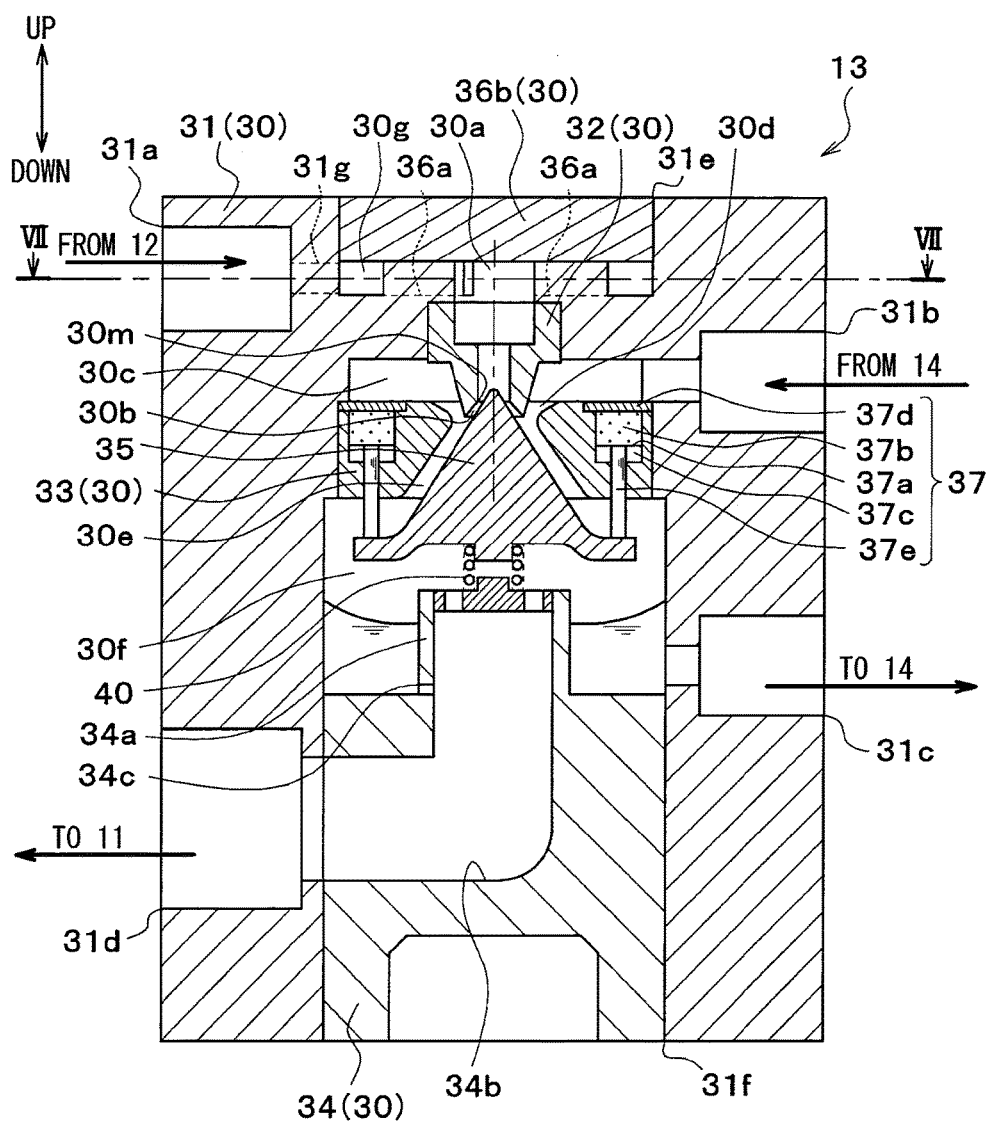
FIG. 6 is an axial cross-sectional view of an ejector of a second embodiment.

As shown in FIG. 6, in this embodiment, an example in which configurations of the distribution space 30g and the driving passage 36a of the ejector 13 are changed with respect to the first embodiment will be described. Specifically, in the ejector 13 of this embodiment, a disk-shaped cover plate 36b is fixed to the upper surface of the housing body 31 by press fitting or the like.

Figure 7:
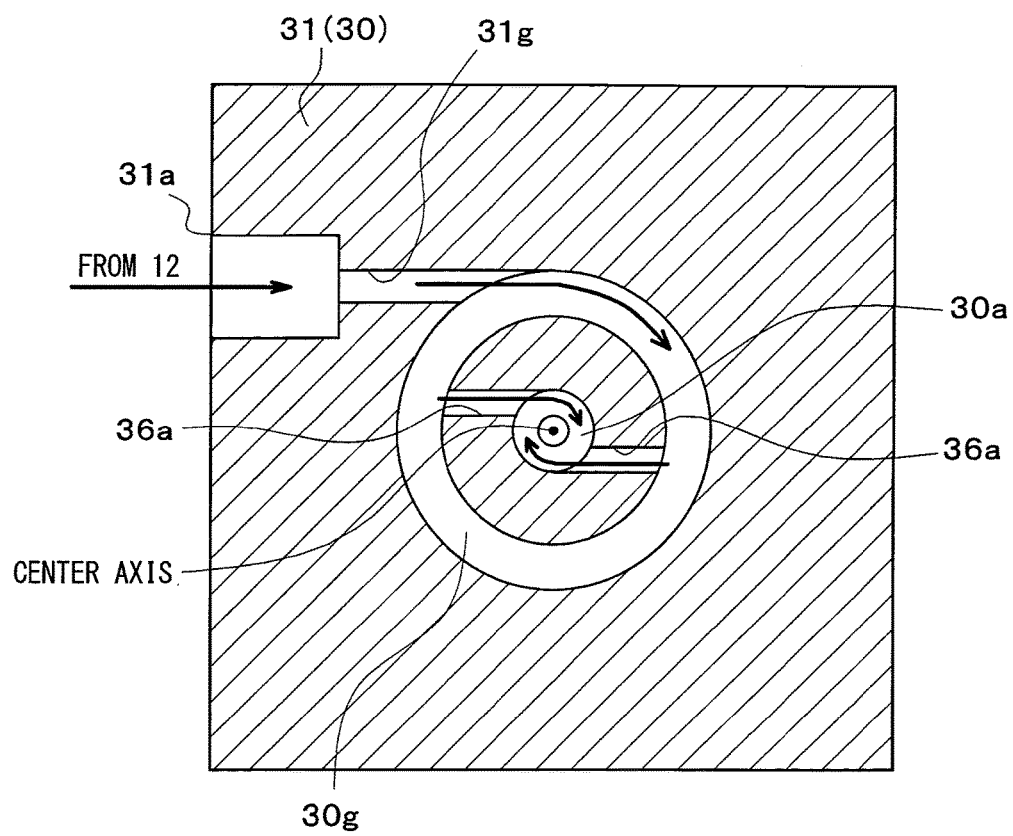
FIG. 7 is a cross-sectional view taken along VII-VII of FIG. 6.

As shown in FIGS. 6 and 7, multiple groove portions that are recessed downward are provided on a portion of an upper surface of the housing body 31 to which the cover plate 36b is fixed. The cover plate 36b is fixed to the upper surface of the housing body 31 by press fitting, the groove portions are partitioned, and the distribution space 30g and the multiple driving passages 36a similar to the first embodiment are provided.

The nozzle body 32 is fixed to the lower side of the housing body 31 inside the housing body 31 by press fitting or the like. Other configurations are similar to those of the first embodiment. Accordingly, even when the distribution space 30g and the driving passage 36a are configured like the ejector 13 of this embodiment, effects similar to the first embodiment can be obtained.

In the ejector 13 of this embodiment, since the driving passages 36a are formed of the groove portions formed on the upper surface of the housing body 31, a depth dimension (a width dimension in a vertical direction of FIG. 6) in an axial direction of the refrigerant outlet port of the driving passage 36a can be easily adjusted. Accordingly, a refrigerant flows from the driving passage 36a into the swirling space 30a over a wider width range in the axial direction by increasing a width dimension in the axial direction of the refrigerant outlet port of the driving passage 36, and a swirl flow of a refrigerant in the swirling space 30a can be promoted.

(Other Embodiments)

The present disclosure is not limited to the above-described embodiments, and within a scope which does not depart from the gist of the present disclosure, various modifications may be applied to the present disclosure as follows. (1) In the above-described embodiments, the example is described in which two driving passages 36a are provided, and when viewed along the center axis direction of the swirling space 30a, the refrigerant outlets of the driving passages 36a provided on the swirling space 30a side are opened at 180° intervals. However, the number and the disposition of the driving passages 36a are not limited to this.

Figure 8:
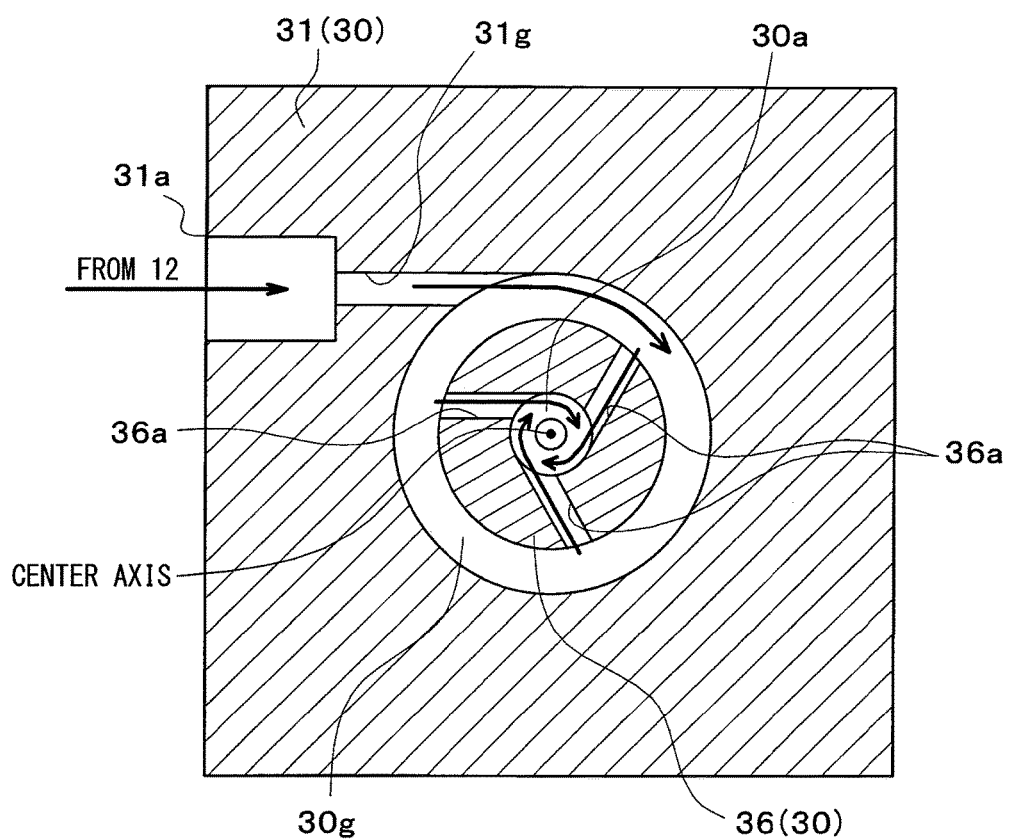
FIG. 8 is a cross-sectional view showing a driving passage of an ejector of another embodiment.
Figure 9:
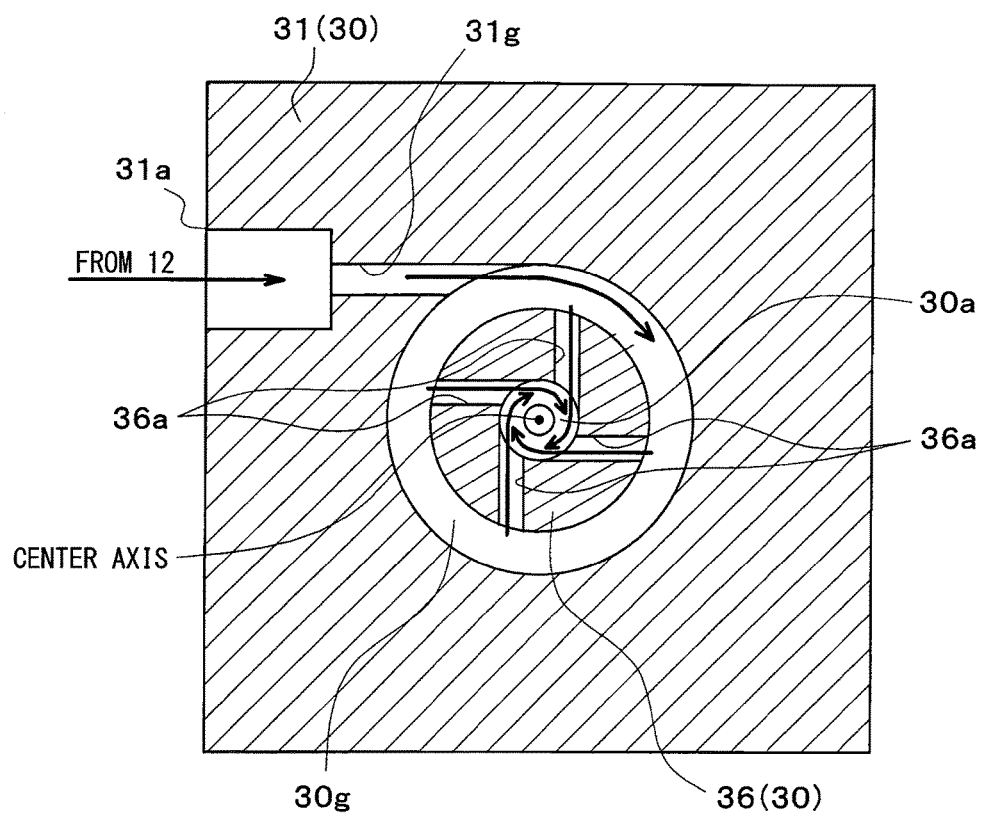
FIG. 9 is a cross-sectional view showing another driving passage of an ejector of still another embodiment.

For example, as shown in FIG. 8, the number of the multiple driving passages 36a may be set to three, and when viewed along the center axis direction of the swirling space 30a, the refrigerant outlets of the driving passages 36a provided on the swirling space 30a side may be opened at 120° intervals. In this case, inflow directions of refrigerants that flow from the driving passages 36a into the swirling space 30a are different from one another by 120°. As shown in FIG. 9, the number of the driving passages 36a may be set to four, and when viewed along the center axis direction of the swirling space 30a, the refrigerant outlets of the driving passages 36a provided on the swirling space 30a side may be opened at 90° intervals. In this case, inflow directions of refrigerants that flow from the driving passages 36a into the swirling space 30a are different from one another by 90°.

Figure 10:
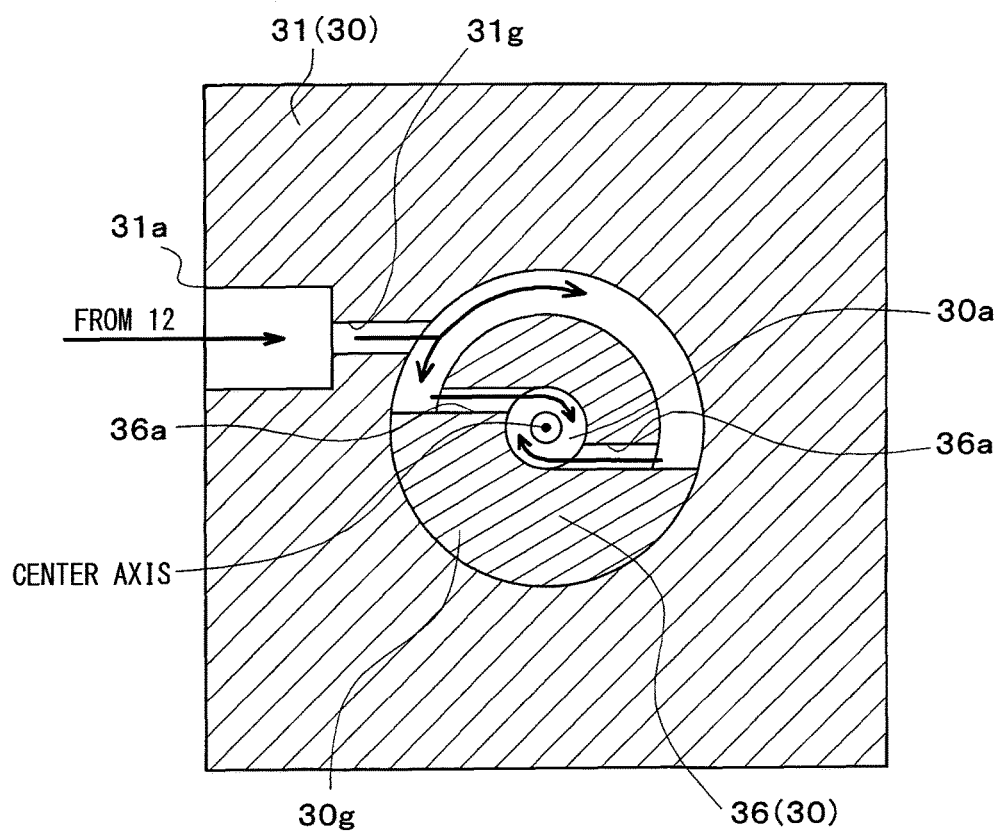
FIG. 10 is a cross-sectional view showing a distribution space and a driving passage of an ejector of still another embodiment.

In the above-described first embodiment, the example in which the groove portions are provided over the entire circumference of the tubular side surface of the upper cover 36 is described. However, as long as a state of a refrigerant in the distribution space 30g can be homogenized, as shown in FIG. 10, groove portions provided in a portion of the tubular side surface of the upper cover 36 may form the distribution space 30g.

The shape of the refrigerant inflow passage 31g is not limited to the shape in which the refrigerant inflow passage 31g extends in the tangential direction of the outer circumference of the distribution space 30g. FIGS. 8 to 10 are drawings corresponding to FIG. 3 of the first embodiment.

(2) In the above-described second embodiment, the example in which the distribution space 30g and the driving passage 36a having the same shapes as those of the first embodiment are provided is described. However, the groove portion that forms the distribution space 30g and the driving passage 36a in the second embodiment may be formed by milling the upper surface of the housing body 31 or the like. Therefore, according to the configuration of the second embodiment, a design freedom in the shapes of the distribution space 30g and the driving passage 36a can be improved.

Figure 11:
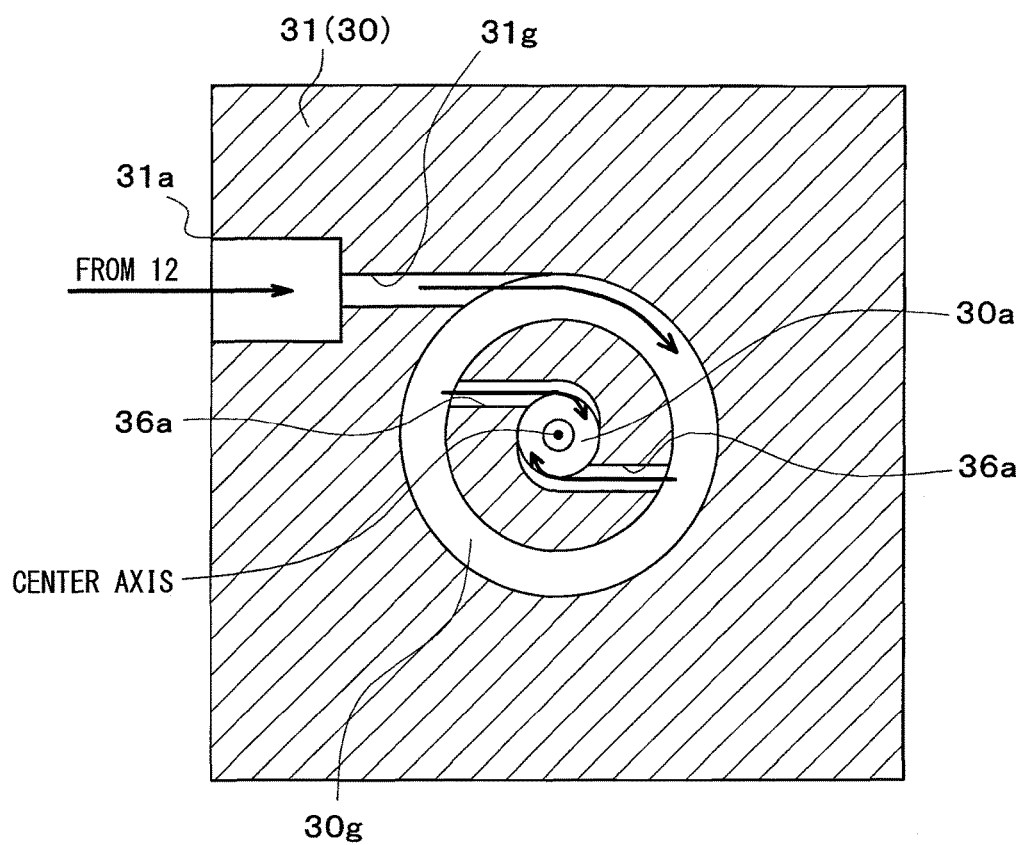
FIG. 11 is a cross-sectional view showing another driving passage of an ejector of still another embodiment.

Accordingly, for example, when viewed along the center axis direction of the swirling space 30a, the driving passage 36a may be provided so as to be bent. Specifically, as long as the refrigerant that has flowed from the driving passage 36a into the swirling space 30a is capable of flowing along the outer circumference of the swirling space 30a, as shown in FIG. 11, the driving passage 36a may be provided so as to be bent from the outer circumferential side of the swirling space 30a toward an outer circumference tangent of the swirling space 30a.

Figure 12:
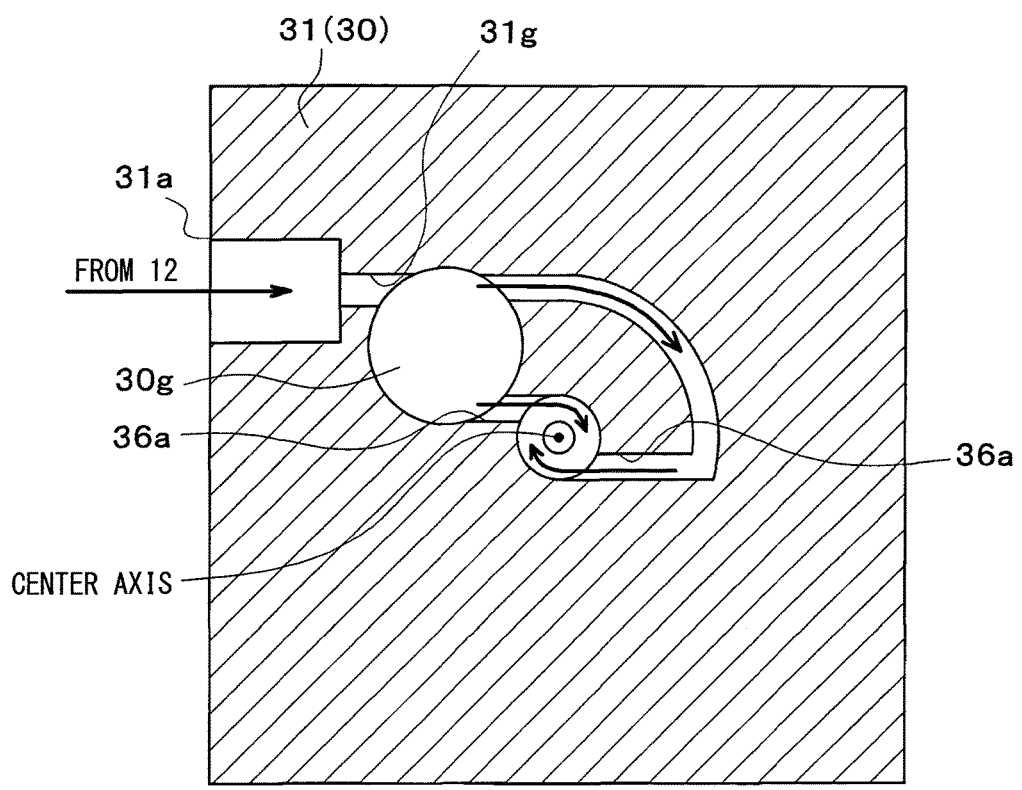
FIG. 12 is a cross-sectional view showing another distribution space and another driving passage of an ejector of still another embodiment.

As shown in FIG. 12, the distribution space 30g is formed in a circular sectional shape or a rectangular sectional shape, and the distribution space 30g may function as a branch part for branching a flow of a refrigerant that has flowed in from the refrigerant inlet port 31a and may divide the flow of the refrigerant from the distribution space 30g to the driving passage 36a. That is, the branch part for branching the flow of the refrigerant that has flowed in from the refrigerant inlet port 31a into the driving passages 36a may be provided in the body 30.

Figure 13:
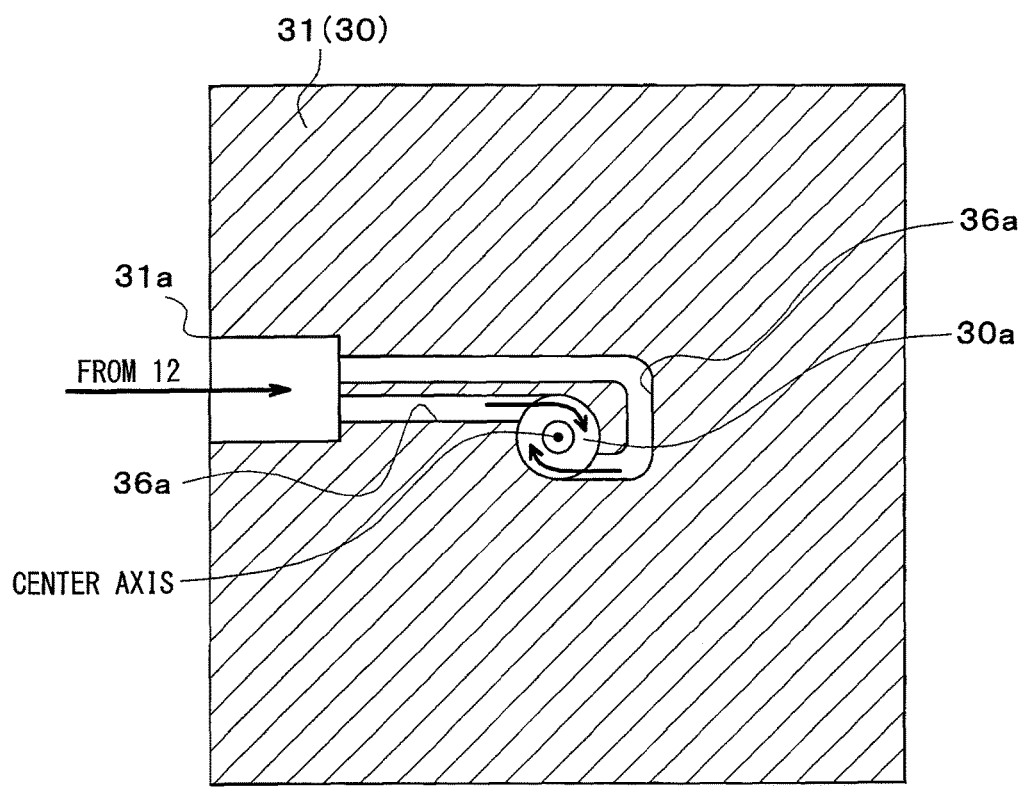
FIG. 13 is a cross-sectional view showing another driving passage of an ejector of still another embodiment.

As shown in FIG. 13, the distribution space 30g is removed, and the refrigerant that has flowed in from the refrigerant inlet port 31a may directly flow into the driving passage 36a. In this case, even when the distribution space 30g is removed, preferably, the refrigerant that flows into the driving passage 36a is homogenized. FIGS. 11 to 13 are drawings corresponding to FIG. 7 of the second embodiment.

(3) In the above-described embodiments, the driving portion 37 that displaces the passage-forming member 35 includes the sealed space 37b in which the temperature sensitive medium in which a pressure is changed according to a temperature is sealed, and the diaphragm 37a which is displaced according to a pressure of the temperature sensitive medium in the sealed space 37b. However, the driving portion is not limited to this.

For example, the temperature sensitive medium may adopt a thermo-wax in which a volume is changed according to a temperature, the driving portion may adopt a configuration having an elastic member formed of a shape memory alloy, and the driving portion may adopt a configuration which displaces the passage-forming member 35 by an electrical mechanism such as an electric motor or a solenoid.

(4) In the above-described embodiments, the liquid-phase refrigerant outlet port 31c of the ejector 13 is not described in detail. However, a depressurization device (for example, a side fixed throttle including an orifice or a capillary tube) which depressurizes a refrigerant may be disposed in the liquid-phase refrigerant outlet port 31c.

(5) In the above-described embodiments, the example in which the ejector type refrigeration cycle 10 including the ejector 13 of the present disclosure is applied to a vehicle air conditioning apparatus is described. However, application of the ejector type refrigeration cycle 10 including the ejector 13 of the present disclosure is not limited to this. For example, the ejector type refrigeration cycle 10 may be applied to a stationary air conditioning apparatus, a cryogenic storage warehouse, an automatic vending machine-cooling and heating device, or the like.

In the above-described embodiments, the radiator 12 is used for an outdoor-side heat exchanger by which heat exchange between a refrigerant and outside air is performed, and the evaporator 14 is used for a utilization-side heat exchanger which cools blast air. On the other hand, the ejector 13 of the present disclosure may be applied to a heat pump cycle in which the evaporator 14 is configured of an exterior-side heat exchanger which absorbs heat from a heat source such as an outside air, and the radiator 12 is configured of an interior-side heat exchanger which heats a fluid to be heated such as air or water.

(6) In the above-described embodiments, the example in which a sub-cool type heat exchanger is adopted as the radiator 12 is described. However, a general radiator including only the condenser 12a may be adopted. In the above-described embodiments, the example in which constituent members such as the body 30 of the ejector 13 or the passage-forming member 35 are formed of metal is described. However, as long as functions of constituent members can be exerted, the materials are not limited. Accordingly, the constituent members may be formed of a resin.

What is claimed is:

1. An ejector applied to a vapor compression refrigeration cycle device, the ejector comprising:
    a body having a swirling space that swirls a refrigerant that has flowed in from a refrigerant inlet port, a depressurizing space that depressurizes the refrigerant that has flowed out from the swirling space, a suction-passage that is in communication with a downstream side of the depressurizing space in a refrigerant flow and that draws the refrigerant from an outside, and a pressurizing space, the refrigerant sprayed from the depressurizing space and the refrigerant drawn from the suction-passage flowing into the pressurizing space; and
    a passage-forming member, at least a portion of the passage-forming member being disposed inside the depressurizing space and the pressurizing space, the passage-forming member having a conical shape in which a sectional area thereof gradually widens in a direction away from the depressurizing space, wherein
    a refrigerant passage formed between an inner circumferential surface of a portion of the body defining the depressurizing space and an outer circumferential surface of the passage-forming member is a nozzle passage that depressurizes and sprays the refrigerant that has flowed out from the swirling space,
    a refrigerant passage formed between an inner circumferential surface of a portion of the body defining the pressurizing space and the outer circumferential surface of the passage-forming member is a diffuser passage that converts kinetic energy of a mixed refrigerant of the sprayed refrigerant and the drawn refrigerant into pressure energy,
    the swirling space is formed in a rotational body shape that is symmetrical about a center axis,
    the center axis of the swirling space and a center axis of the passage-forming member are coaxially arranged,
    a plurality of driving passages through which the refrigerant is introduced from the refrigerant inlet port into the swirling space are formed in the body, and
    when viewed along an axial direction of the passage-forming member, the refrigerants flowing in from the plurality of driving passages into the swirling space have velocity components in directions in which the refrigerants flow along an outer circumference of the swirling space, the directions of the velocity components being different from each other.

2. The ejector according to claim 1, wherein
    when viewed along the axial direction of the passage-forming member, refrigerant outlet ports of the plurality of driving passages to the swirling space are positioned at equal angle intervals around the center axis of the swirling space.

3. The ejector according to claim 1, wherein
    a distribution space that distributes the refrigerant that has flowed in from the refrigerant inlet port into the plurality of driving passages is formed in the body, and the distribution space is a space that causes the refrigerant to be distributed from the distribution space into respective ones of the plurality of driving passages in a similar state as each other.

4. The ejector according to claim 3, wherein when viewed along the axial direction of the passage-forming member, the distribution space is annularly formed and is positioned radially outward of the swirling space.

5. The ejector according to claim 3, wherein a cylindrical member is disposed as the body, the cylindrical member defining therein at least a portion of the swirling space, and the distribution space is a groove portion formed on a tubular side surface of the cylindrical member.

\* \* \* \* \*